(12) United States Patent
Nozue et al.

(10) Patent No.: US 7,710,985 B2
(45) Date of Patent: May 4, 2010

(54) BRIDGED LAN AND COMMUNICATION NODE THEREFOR

(75) Inventors: Daiki Nozue, Fujisawa (JP); Hiroaki Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 11/780,070

(22) Filed: Jul. 19, 2007

(65) Prior Publication Data

US 2008/0137557 A1 Jun. 12, 2008

(30) Foreign Application Priority Data

Dec. 7, 2006 (JP) ............................ 2006-330992

(51) Int. Cl.
*H04L 12/28* (2006.01)
(52) U.S. Cl. .................. 370/401; 370/395.53; 370/256
(58) Field of Classification Search ....................... None
See application file for complete search history.

(56) References Cited

U.S. PATENT DOCUMENTS

| | | | | |
|---|---|---|---|---|
| 6,801,506 | B1 * | 10/2004 | Dey ........................... | 370/256 |
| 7,286,491 | B1 * | 10/2007 | Smith ........................ | 370/256 |
| 2004/0032868 | A1 * | 2/2004 | Oda et al. ................... | 370/389 |
| 2005/0152289 | A1 * | 7/2005 | Nagata et al. ............... | 370/256 |
| 2006/0002370 | A1 * | 1/2006 | Rabie et al. ................. | 370/351 |
| 2006/0182133 | A1 * | 8/2006 | Choumaru et al. .......... | 370/401 |
| 2006/0245438 | A1 * | 11/2006 | Sajassi et al. ............... | 370/399 |
| 2008/0019385 | A1 * | 1/2008 | Sultan et al. ................ | 370/401 |

OTHER PUBLICATIONS

IEEE 802.1: 802.1D—MAC bridges, STP (Spanning Tree Protocol), 9 pages, dated May 24, 2007.
IEEE 802.1: 802.1Q—Virtual LANs, (Virtual Local Area Networks), 6 pages, dated May 24, 2007.
IEEE 802.1:802.1s—Multiple Spanning Trees, MST (Multiple Spanning Tree Protocol), 3 pages, dated May 24, 2007.

* cited by examiner

*Primary Examiner*—Phirin Sam
(74) *Attorney, Agent, or Firm*—Antonelli, Terry, Stout & Kraus, LLP.

(57) ABSTRACT

A spanning tree is formed for each of MST (Multiple Spanning Tree Protocol) instances defined by a VLAN ID and a COS value. Each terminal apparatus specifies the COS value corresponding to the TCP/UDP port number of a Ethernet frame to be transmitted, based on a conversion table indicating the correspondence of a TCP/UDP port number to a COS value and sets the specified COS value to the header of the Ethernet frame. Each of bridges in the transit network specifies the MST instance identifier of a received frame based on a conversion table indicating the correspondence of the MST instance identifier to the combination of a VLAN ID and a COS value and forwards the received frame in accordance with the spanning tree having the specified MST instance.

7 Claims, 15 Drawing Sheets

TCP/UDP PORT NUMBER-TO-COS CONVERSION TABLE 130

| TCP/UDP PORT NUMBER (131) | COS VALUE (132) |   |
|---|---|---|
| 80 | 0 | 1301 |
| 5060 | 3 | 1302 |
| . | . | |

VLAN ID & COS-TO-MST instance
CONVERSION TABLE 350

| VLAN ID (351) | COS (352) | MST instance (353) | |
|---|---|---|---|
| 1 | 0 | 1 | ~3501 |
| 2 | 0 | 2 | ~3502 |
| 2 | 3 | 3 | ~3503 |

Ethernet FRAME 60

COS VALUE SETTING TABLE 420

| Ethernet PORT NUMBER (421) | COS VALUE SETTING FLAG (422) |
|---|---|
| #1 | 1 |
| #2 | 0 |

TCP/UDP PORT NUMBER-TO-COS
CONVERSION TABLE 430

| TCP/UDP PORT NUMBER 431 | COS VALUE 432 |
|---|---|
| 80 | 0 |
| 5060 | 3 |

US 7,710,985 B2

BRIDGED LAN AND COMMUNICATION NODE THEREFOR

CLAIM OF PRIORITY

The present application claims priority from Japanese patent application serial No. 2006-330992, filed on Dec. 7, 2006, the content of which is hereby incorporated by reference into this application.

BACKGROUND OF THE INVENTION

1. Field of the Invention

The present invention relates to a bridged LAN and, more particularly, to a bridged LAN (Local Area Networks) in which a spanning tree is applied to VLANs (Virtual LANs) and to a communication node apparatus, a terminal apparatus, and a gateway apparatus each applied to the bridged LAN.

2. Description of the Related Art

In recent years, there has been an increase in the number of network configurations each including a plurality of geometrically distributed intra-company LANs connected via a transit network, e.g., a public network. FIG. 18 shows an example of such a network configuration, in which LANs #A1 and #A2 in a company A are connected via a transit network NW. Likewise, LANs #B1 and #B2 in a company B are also connected via the transit network NW. For example, a terminal apparatus, such as a personal computer PC-A1, belonging to the LAN #A1 of the company A performs data communication with a terminal apparatus, such as a personal computer PC-A2, belonging to the LAN #A2 of the company A via the transit network NW.

For improved fault tolerance, the transit network NW typically has a network structure in which a plurality of redundant paths are formed by using a plurality of bridges BRs (BR1 to BR4 in FIG. 18). A network in a configuration in which a plurality of LANs are thus connected via bridges is termed "bridged LAN". In the transit network NW, when the plurality of bridges are connected in a loop-like shape, there is a case where a frame having a broadcast address as its destination address, such as, e.g., an ARP (Address Resolution Protocol) frame, is continuously forwarded from one bridge to another and a so-called broadcast storm occurs. As a technology for circumventing the broadcast storm, there is an STP (Spanning Tree Protocol) defined in the IEEE 802.1d.

In the STP, the broadcast storm is circumvented by managing such a loop-shaped network as a logically tree-structured network named "spanning tree". Specifically, in the STP, one of a plurality of bridges forming a loop is selected as a Root bridge in accordance with the value of a bridge ID. Each of the other bridges determines a route to the Root bridge so as to minimize a cost value calculated based on a line speed and clogs the other routes whose cost value are not minimum ("blocking"), whereby the network physically connected in the loop-like shape is managed as a logical spanning tree network.

When there exist a plurality of routes each passing through one of adjacent bridges and having the minimum cost in the direction of the Root bridge, a higher priority is given to one of the routes which passes through the adjacent bridge having a smaller bridge ID. In the STP, data termed "BPDU" for carrying the bridge ID and the cost value determined by the line speed is exchanged between the bridges in the route determining process described above.

FIG. 19 shows an example of a bridged LAN network structure to which the STP is applied. In FIG. 19, four LANs #1 to #4 are connected to each other via bridges BR1 to BR4 connected in a loop-like shape. Although each of the LANs can accommodate a plurality of personal computers, only one personal computer PC is connected to each of the LANs for simple illustration.

Of the bridges BR1 to BR4, the bridge BR1 having a minimum ID serves as a Root bridge. Of three Ethernet ports P11, P12, and P13 in the Root bridge BR1, the ports P11 and P12 are used as designated ports DP. In the bridge BR2, an Ethernet port P21 near the Root bridge BR1 is used as a root port RP and an Ethernet port P22 far from the Root bridge is used as the designated port DP.

In the bridge BR4, an Ethernet port P41 near the Root bridge is used as the root port RP and an Ethernet port P42 far from the Root bridge is used as the designated port DP. In the bridge BR3, an Ethernet port P32 connected to the bridge BR2 is used as the root port RP and an Ethernet port P31 connected to the bridge BR4 is used as a non-designated port NDP, whereby the line between the bridges BR3 and BR4 is blocked. Thus, a spanning tree having the Root bridge as a peak can be constructed in the STP by determining the Root bridge, the root ports, the designated ports, and the non-designated ports.

In recent years, as the scale of a network increases, VLANs (Virtual Local Area Networks) formed by dividing a single LAN into a plurality of virtual LANs are also operated. The VLAN is defined in the IEEE 802.1q. When a network is divided into a plurality of VLANs, it becomes possible to reduce the arrival range (broadcast domain) of a broadcast frame, such as an ARP, and circumvent the congestion of the network bandwidth.

As a technology which implements the STP on the VLAN described above, there is an MST (Multiple Spanning Tree Protocol) defined in the IEEE 802.1. In the MST, a spanning tree is constructed for each of MST instances composed of a single or a plurality of VLANs.

FIG. 20 shows an example of a network structure of a bridged LAN to which the MST is applied.

In the example, LANs #1 to #4 are connected to each other via a transit network NW including bridges BR1 to BR 4 connected in a loop-like shape. Personal computers PC1-1 to PC1-3 are connected to the LAN #1. To the LANs #2 to #4, personal computers PC2, PC3, and PC4 are connected, respectively.

In FIG. 20, two VLANs are formed. The first VLAN #1 is indicated by the solid line and the second VLAN #2 is indicated by the broken line. To the first VLAN #1, the personal computer PC1-1 connected to the LAN #1 and the entire LAN #3 belong. To the second VLAN #2, the personal computers PC1-2 and PC1-3 each connected to the LAN #1 and the entire LANs #2 and #4 belong.

It is assumed here that the VLANs #1 and #2 belong to the MST instances different from each other, which are defined as "MST instance #1" and "MST instance #2". In the MST, the Root bridge RB is selected for each of the MST instances and the root port RP, the designated DP, and the non-designated port NDP are determined for each of the bridges. In the description given below, it is assumed that the bridges BR1 and BR3 are selected as the respective Root bridges RB in the MST instance #1 and the MST instance #2.

In the bridge BR1, the Ethernet port P11 is the designated port DP in each of the MST instances #1 and #2 and the Ethernet port P12 is the designated port DP in the MST instance #1, while it is the non-designated port NDP in the instance #2. In the bridge BR2, the Ethernet port P21 is the root port RP in the MST instance #1, while it is the designated port DP in the MST instance #2, and the Ethernet port P22 is the designated port DP in each of the MST instances #1 and #2.

In the bridge BR3, the Ethernet port P31 is the non-designated port NDP in the MST instance #1, while it is the designated port DP in the MST instance #2, and the Ethernet port P32 is the root port RP in each of the MST instances #1 and #2. In the bridge BR4, the Ethernet port P41 is the root port RP in each of the MST instances #1 and #2 and the Ethernet port P42 is the designated port DP in the MST instance #1, while it is the root port RP in the MST instance #2. As a result, the line between the bridges BR1 and BR2 is blocked in the MST instance #2 and the line between the bridges BR3 and BR4 is blocked in the MST instance #1.

Thus, the MST can construct respective spanning trees individually in the plurality of VLANs (VLAN #1 and VLAN #2 in FIG. 20) and allows a reduction in the scale of the broadcast domain, which is an advantage of the VLAN, simultaneously with the circumvention of the broadcast storm, which is an advantage of the STP.

In the bridged LAN shown in FIG. 20, it is assumed that the personal computer PC1-2 functions as a WEB server, the personal computer PC1-3 functions as a SIP (Session Initiation Protocol) server for session management, the personal computer PC2 is a client of the WEB and the SIP, and the personal computer PC4 is a client of the SIP. These personal computers PC belong to the VLAN #2. The WEB client can receive a WEB service in accordance with a http protocol from the WEB server (PC1-2). On the other hand, SIP clients can perform VoIP (Voice over IP) communication via the SIP server (PC1-3).

Since the line between the port P12 of the bridge BR1 and the port P21 of the bridge BR2 is blocked in the VLAN #2, when the personal computer PC2 receives a WEB service from the WEB server (PC1-2), the personal computer PC2 communicates with the WEB server via the bridges BR2, BR3, BR4, and BR1. When the personal computer PC2 performs VoIP communication with the personal computer PC4 via the SIP server (PC1-3), the personal computer PC2 is also connected to the SIP server (PC1-3) via a communication route sequentially passing through the bridges BR2, BR3, BR4, and BR1 in this order.

In a communication service such as a WEB service which does not require strict real-time transmission, the number of bridges through which communication frames are forwarded does not cause a particular problem. However, in a voice communication such as VoIP, since a data forwarding delay on a network has to be reduced, it is desired to perform communication along a minimum delay route having a smaller number of bridges through which communication frames have to pass.

In the MST, however, the STP is applied to each of the VLANs individually as described above and it is impossible to construct a different spanning tree for each of services in the transit network. Accordingly, in a case where the personal computer PC2 belonging to the VLAN #2 performs VoIP communication with the personal computer PC4 in FIG. 20, e.g., the personal computer PC2 cannot access the SIP server (PC1-3) via a shortest route passing only through the bridges BR2 and BR1. Thus, according to the existing MST, it is difficult to construct spanning trees different depending on a service type, such as WEB service or VoIP.

SUMMARY OF THE INVENTION

An object of the present invention is to provide a bridged LAN which can construct spanning trees different for each of services in a transit network.

Another object of the present invention is to provide a communication node apparatus which can construct spanning trees different for each of services in the transit network of the bridged LAN.

Still another object of the present invention is to provide a communication terminal apparatus and a gateway apparatus each for generating communication frames which can be forwarded via a route suited to the service type in the transit network of the bridged LAN.

In order to attain the objects, the present invention is characterized in that a spanning tree is formed for each of MST instances defined by a combination of a VLAN ID and a service class in a transit network for connecting a plurality of LANs in a bridged LAN to each other. As the service class, a COS (Class of Service) defined in a tag field of the header portion of an Ethernet frame can be used.

In the present invention, each of terminal apparatuses, such as personal computers, to be connected to the bridged LAN specifies a COS value corresponding to a TCP/UDP port number used by a network application by referring to, e.g., a conversion table indicating the correspondence of the TCP/UDP port number to the COS value and sets the specified COS value together with the identifier of a VLAN to which the terminal apparatus belongs to the header portion of a transmission frame. Each of bridges composing the transit network specifies the MST instance identifier of a received frame by referring to a conversion table indicating the correspondence of the MST instance identifier and the combination of the VLAN ID and the COS value.

More specifically, a bridged LAN according to the present invention comprises: a transit network in which a plurality of VLANs (Virtual LANs) are formed, and a plurality of LANs connected to the transit network in which a logical spanning tree is formed for each of MST (Multiple Spanning Tree Protocol) instances composed of one or more of VLANs, the transit network being composed of a plurality of bridges for transmitting and receiving Ethernet frames, wherein each of the bridges has a conversion table defining an identifier of each of the MST instances in association with a combination of a VLAN identifier and a value of a COS (Class of Service), and means for forming in the transit network the spanning tree for each of the MST instance identifiers defined in the conversion table, wherein each of the bridges extracts a VLAN identifier and a COS value from a header of a received frame, specifies the MST instance identifier of the received frame in accordance with the conversion table, and forwards the received frame in accordance with a route of the spanning tree having the MST instance identifier.

The present invention provides a communication node apparatus, a terminal apparatus, and a gateway each suited to the bridged LAN in which a spanning tree is formed in accordance with the MST.

A communication node apparatus according to the present invention comprises: a plurality of port interfaces each for transmitting and receiving Ethernet frames; a conversion table for defining each of MST instance identifiers in association with a combination of a VLAN identifier and a value of a COS (Class of Service); means for forming a spanning tree for each of the MST instance identifiers defined in the conversion table; and a routing control unit for specifying in accordance with the conversion table, on receiving an Ethernet frame from one of the port interfaces, the MST instance identifier corresponding to the combination of the VLAN identifier and the COS value indicated in a header of the received frame, and forwarding the received frame in accordance with a route in the spanning tree having the MST instance identifier.

A terminal apparatus according to the present invention comprises: a conversion table indicating the correspondence of a TCP/UDP port number to a value of a COS (Class of Service); means for specifying the COS value to be applied to an Ethernet transmission frame by referring to the conversion table in accordance with the TCP/UDP port number used by a network application; and means for transmitting the Ethernet frame including an identifier of the VLAN to which the terminal apparatus belongs and the specified COS value in its header portion to the bridged LAN.

Instead of each of the terminal apparatuses, the COS value may be given to the Ethernet frame by a gateway apparatus located between the LAN and the transit network.

A gateway apparatus according to the present invention comprises: a plurality of port interfaces each having a port numbers; a conversion table for indicating the correspondence of a TCP/UDP port number to a value of a COS (Class of Service); a COS value setting table storing flag information for indicating whether a COS value should be set to a received or not in association with the port number; and routing control means for searching, on receiving an Ethernet frame from one of the port interfaces, the COS value setting table for flag information corresponding to the port number of one of the port interfaces to be the destination of the received frame, searching the conversion table for a COS value corresponding to the TCP/UDP port number of the received frame when the flag information indicates that the COS value should be set, setting the COS value to a header portion of the received frame, and forwarding the received frame to the port interface specified by the destination port number.

According to the present invention, a communication service with a small forwarding delay in a transit network can be offered by allocating a specified COS value to a communication service which needs a real-time property and preliminarily reserving an optimum route in a spanning tree in association with the specified COS value.

It is not that all network applications perform communication services using the TCP/UDP. Further, even in a communication service using the TCP/UDP, data frames for a communication service which is tolerant in terms of the real-time property need not pass through the optimum route. Therefore, such data frames may be forwarded with a versatile spanning tree by allocating a default COS value, e.g., "0" to a communication service which does not particularly need the optimum route and associating one or a plurality of VLANs having the default COS value with a default MST instance identifier.

According to the present invention, since a spanning tree can be formed in the transit network of a bridged LAN in accordance with the type of a service used by a network application, even though a plurality of data frames have the same VLAN identifier, data frames having a high real-time property can be forwarded through an optimized communication route different from a communication route for the other data frames. In addition, in a bridged LAN according to the present invention, it is also possible to make use of the advantage achieved by dividing the broadcast domain, which is a characteristic feature of the VLAN, and a broadcast-storm suppressing effect which is an advantage of the STP.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE PREFERRED EMBODIMENTS

Figure 1:
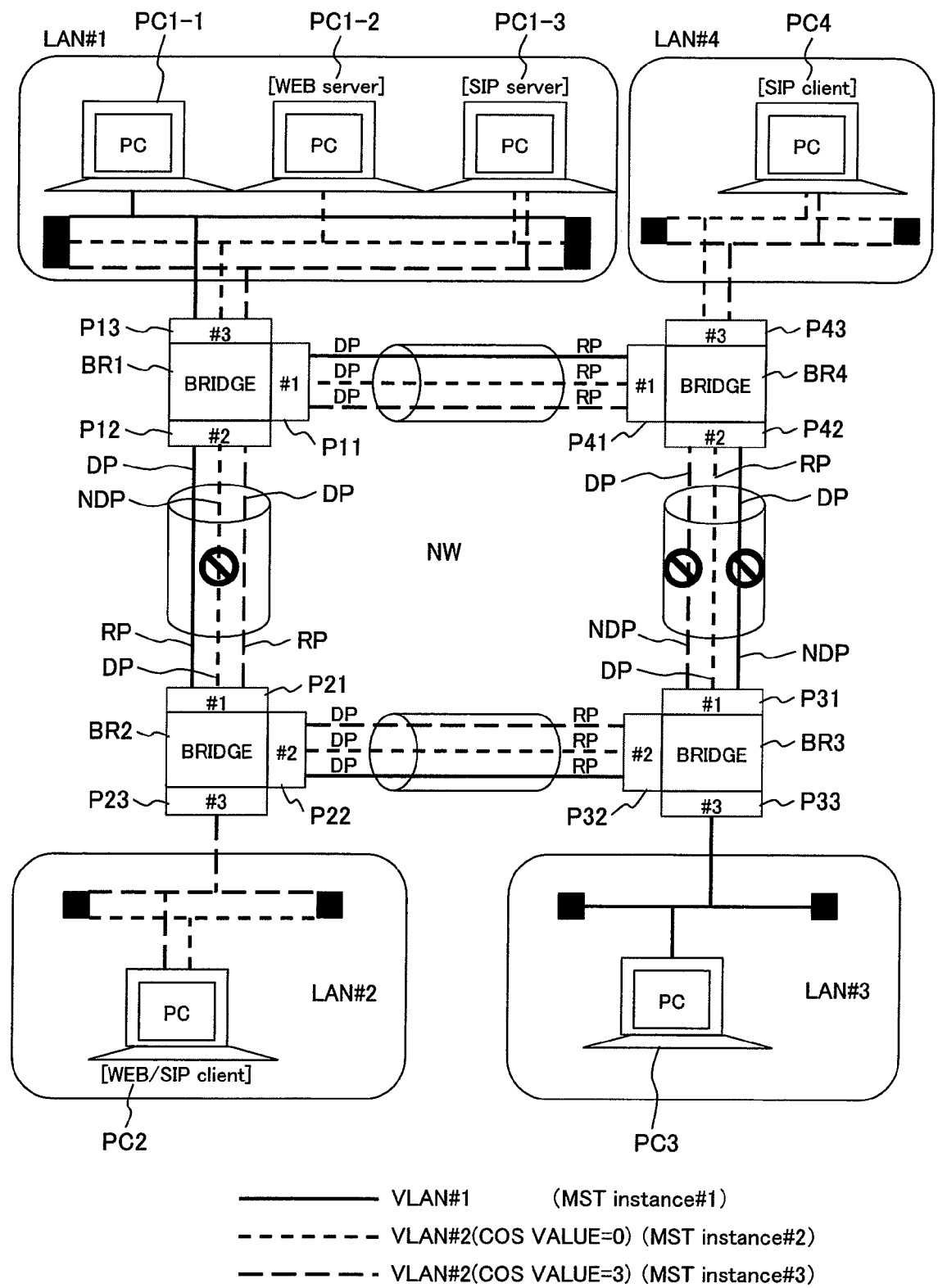
FIG. 1 is a view showing a first embodiment of a bridged VLAN to which the present invention is applied.

By referring to the drawings, the embodiments of the present invention will be described herein below in detail.

Embodiment 1

Figure 20:
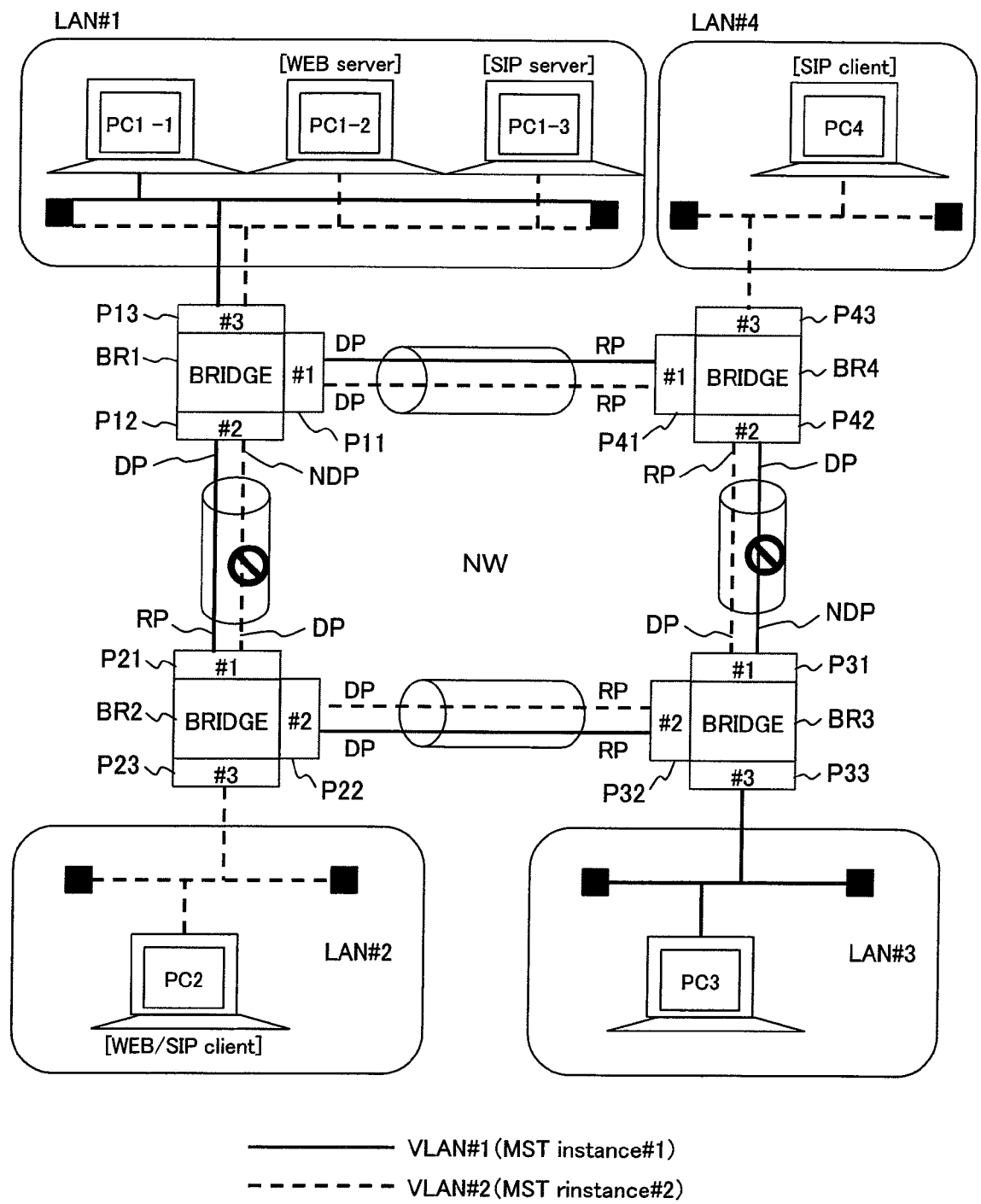
FIG. 20 is a view showing an example of a conventional network structure to which the MST is applied.

FIG. 1 shows an example of a network structure of a bridged VLAN to which the present invention is applied. The network shown here as an example includes LANs #1 to #4 and a transit network NW including bridges BR1 to BR4 connected in a loop-like shape. To the LANs #1 to #4, personal computers PC1-1 to PC1-3, PC2, PC3, and PC4 are connected, respectively, in the same manner as in FIG. 20.

In the bridged LAN shown in FIG. 1, two VLANS; a VLAN #1 indicated by the solid line and a VLAN #2 indicated by the broken line, are formed. In the same manner as in FIG. 20, the personal computer PC1-1 connected to the LAN #1 and the entire LAN #3 belong to the VLAN #1. The personal computers PC1-2 and P1-3 each connected to the LAN #1, the entire LAN #2, and the entire LAN #4 belong to the VLAN #2. In the VLAN #2, the personal computer PC1-2 functions as a WEB server, the personal computer PC1-3 functions as a SIP server, the personal computer PC2 is a client of WEB and SIP, and the personal computer PC4 is a SIP client.

In the present embodiment, as the values of a COS (Class of Service) to be included in the tag field of an Ethernet header, a specified value "3" is allocated to a SIP service with TCP Port Number="5060" and a default value "0" is allocated to a WEB service with TCP Port Number="80". The VLAN #1 belongs to an MST instance #1. On the other hand, the VLAN #2 is divided into two spanning trees, of which the VLAN #2 with COS=0 belongs to an MST instance #2 and the VLAN #2 with COS=3 belongs to an MST instance #3.

In the present embodiment also, an appropriate bridge is used as a Root bridge RB for each of the MST instances and a root port RP, a designated port DP, and a non-designated port NDP are determined for each of the bridges. In the MST instances #1 and #3, the bridge BR1 is used as the Root bridge PB. In the MST instance #2, the bridge BR3 is used as the Root bridge BR. These Root bridges RB are designated by a network administrator. The root port RP, the designated port DP, and the non-designated port NDP are automatically determined in accordance with the MST.

In the bridge BR1, an Ethernet port P11 is the designated port DP in each of the MST instances #1 to #3 and an Ethernet port P12 is the designated port DP in the MST instances #1 and #3, while it is the non-designated port NDP in the MST instance #2. In the bridge BR2, an Ethernet port P21 is the root port RP in the MST instances #1 and #3, but the Ethernet port P21 is the designated port DP in the MST instance #2. An Ethernet port P22 is the designated port DP in each of the MST instances #1 to #3.

In the bridge BR3, an Ethernet port P31 is the non-designated port NDP in the MST instances #1 and #3, but the Ethernet port p31 is the designated port DP in the MST instance #2. An Ethernet port P32 is the root port RP in each of the MST instances #1 to #3. In the bridge BR4, an Ethernet port P41 is the root port RP in each of the MST instances #1 to #3 and an Ethernet port P42 is the designated port DP in the MST instances #1 and #3, while it is the root port RP in the MST instance #2.

Therefore, respective spanning trees are formed individually by blocking the line between the bridges BR3 and BR4 in the MST instances #1 and #3 and blocking the line between the bridges BR1 and BR2 in the MST instance #2.

When the personal computer PC2 connected to the LAN #2 receives a WEB service from the WEB server (PC1-2), communication frames with COS=0 are communicated between the personal computer PC2 and the WEB server (PC1-2). In the MST instance #2 to which the VLAN #2 with COS=0 belongs, since the line between the bridge BR1 (Ethernet port P12) and the bridge BR2 (Ethernet Port P21) is blocked, the frame transmitted from the personal computer PC2 is forwarded to the WEB server (PC1-2) along a route sequentially passing through the bridges BR2, BR3, BR4, and BR1 in this order. The frame transmitted from the WEB server (PC1-2) to the personal computer PC2 is forwarded to the personal computer PC2 along the reverse route sequentially passing through the bridges BR1, BR4, BR3, and BR2 in this order.

When the personal computer PC2 performs VoIP communication with the personal computer PC4 via the SIP server (PC1-3), the COS value of a communication frame is "3". In the MST instance #3 to which the VLAN #2 with COS=3 belongs, since the personal computer PC2 and the SIP server (PC1-3) are allowed to communicate with each other via a shortest route passing only through the bridges BR2 and BR1, it is possible to minimize a data forwarding delay.

Figure 2:
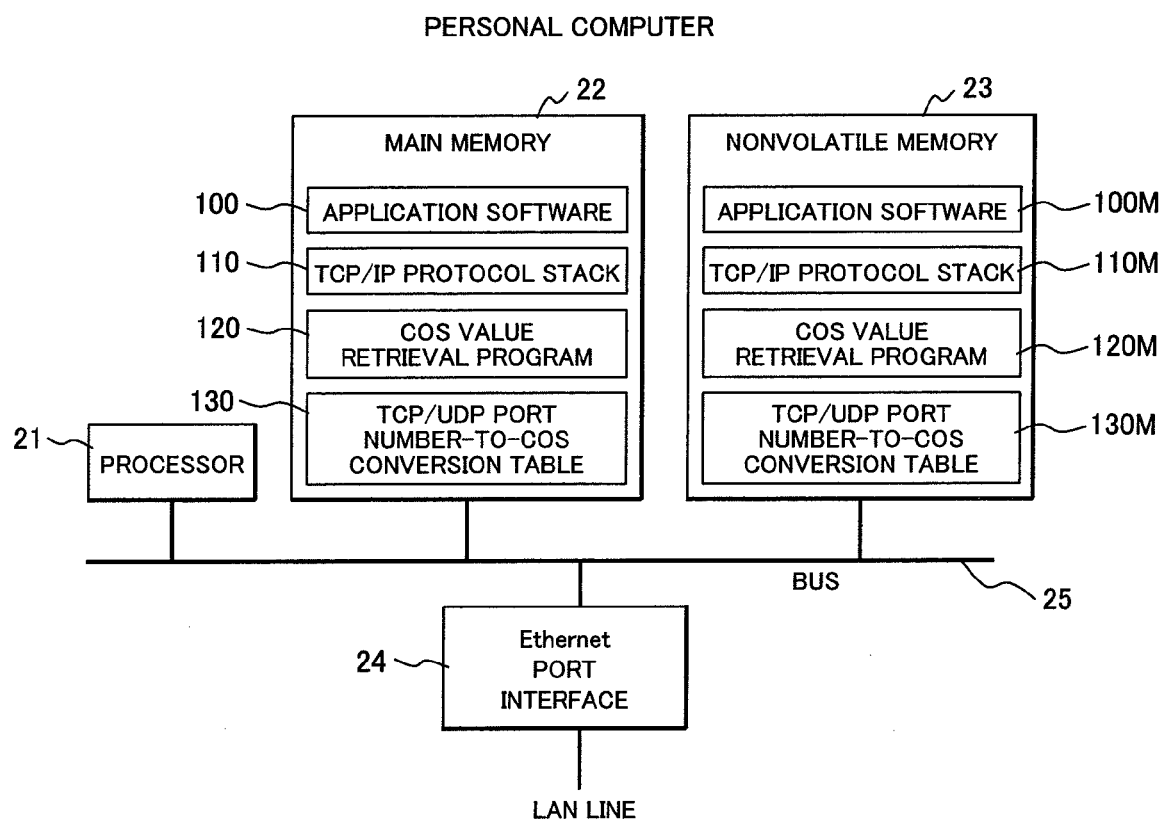
FIG. 2 is a structural view showing an embodiment of a personal computer PC applied to the bridged VLAN according to the present invention.

FIG. 2 shows an embodiment of a personal computer PC applied to the bridged VLAN according to the present invention.

The personal computer PC comprises a processor (CPU) 21, a main memory 22, a nonvolatile memory 23, an Ethernet port interface 24, and an internal bus 25 connecting these components to each other. The nonvolatile memory 23 stores, as software related to the present invention, at least one application software program 100M, a TCP/IP protocol stack 110M, a COS value retrieval program 120M, and a TCP/UDP port number-to-COS conversion table 130M. On the activation of the personal computer PC, these programs and table are loaded into the main memory 22 (100 to 130) and executed or referred to by the processor 21.

As application software program 100 (100M), appropriate software programs are prepared in accordance with the function of the personal computer PC. For example, a SIP client software program is prepared for the personal computer PC4 and a WEB client software program and a SIP client software program are prepared for the personal computer PC2. For the personal computers PC1-2 and PC1-3, a WEB server software program and a SIP server software program are prepared, respectively.

The processor 21 executes the application software programs 100 and communicates with another personal computer PC connected to the network NW by using the TCP/IP protocol stack 110.

The COS value retrieval program 120 is called by the TCP/IP protocol stack 110. The COS value retrieval program 120 searches the TCP/UDP port number-to-COS conversion table 130 for a COS value corresponding to the TCP/UDP port number specified by the TCP/IP protocol stack 110 and returns the corresponding COS value to the TCP/IP protocol stack. The processor 21 sets the COS value to the tag field in the Ethernet header of a communication frame and transmits the communication frame from the Ethernet port interface 24 to the LAN.

Figures 3, 4:
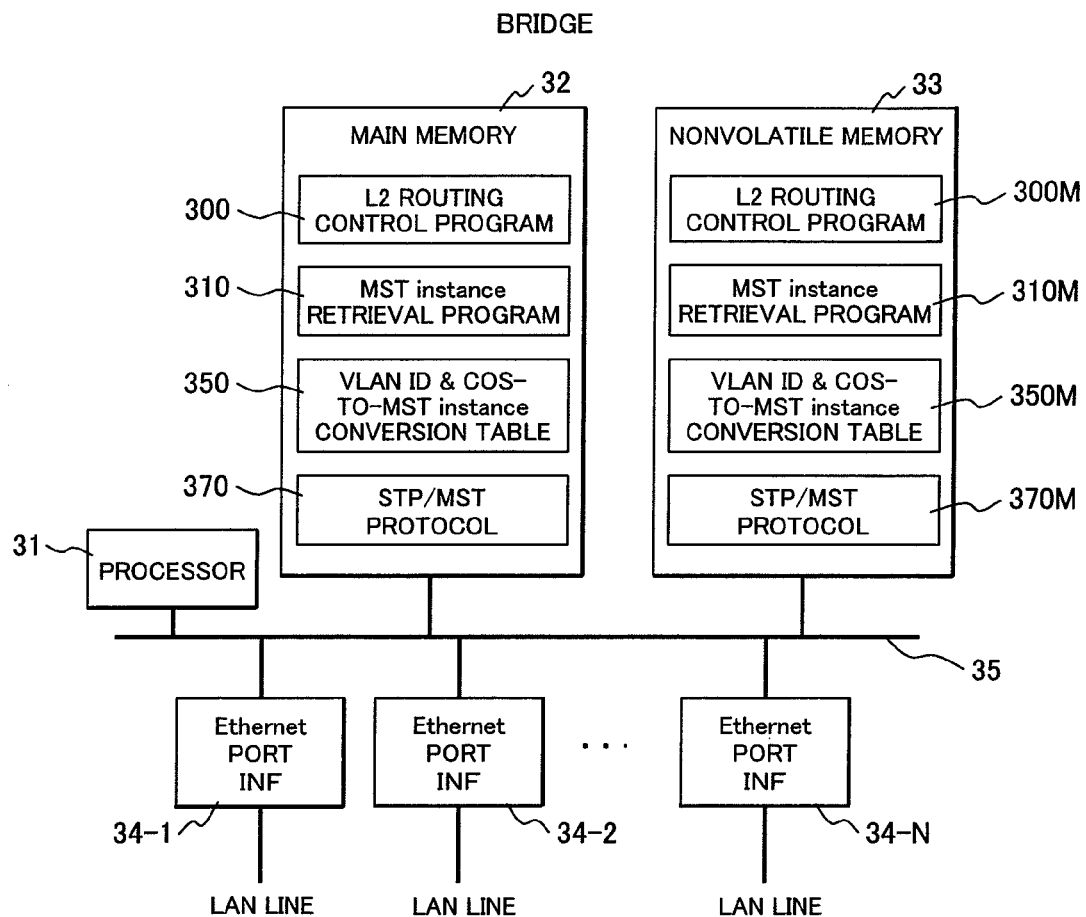
FIG. 3 is a structural view showing an embodiment of a bridge BR to be applied to the bridged VLAN according to the present invention.
FIG. 4 is a view showing an example of a TCP/UDP port number-to-COS conversion table provided in the personal computer PC shown in FIG. 2.

FIG. 3 shows an embodiment of a bridge BR to be applied to the bridged VLAN according to the present invention.

The bridge BR comprises a processor (CPU) 31, a main memory 32, a nonvolatile memory 33, a plurality of Ethernet port interfaces (INF) 34-1 to 34-N, and an internal bus 35 connecting these components to each other.

In the nonvolatile memory 33, an L2 routing control program 300M, an MST instance retrieval program 310M, a VALN ID & COS-to-MST instance conversion table 350, and an STP/MST protocol program 370M are prepared as software related to the present invention. On the activation of the bridge, these programs and table are loaded in the main memory 32 (300 to 370) and executed or referred to by the processor 31.

Communication frames received by the Ethernet port interfaces 34 (34-1 to 34-N) are processed in accordance with the L2 routing control program 300. The L2 routing control program 300 calls the MST instance retrieval program 310 to specify the MST instance identifier corresponding to the COS value indicated in the tag field of the received frame, and determines the Ethernet port interface for forwarding the received frame, in accordance with the route in the spanning tree defined by the MST instance identifier. An STP route is formed according to the STP/MST protocol program 370. In each of the bridges, if the identifier of the MST instance is specified, the identifier of an Ethernet port interface to be the destination of the received frame can be determined based on the configuration information of the spanning tree.

The MST instance retrieval program 310 searches the VLAN ID & COS-to-MST instance conversion table 350 for the identifier of the MST instance corresponding to the VLAN ID and the COS, each specified by the L2 routing control program 300, and returns the MST instance identifier to the L2 routing control program.

FIG. 4 shows an example of the TCP/UDP port number-to-COS conversion table 130 provided in the PC.

The TCP/UDP port number-to-COS conversion table 130 is composed of a plurality of table entries each indicating the correspondence of the TCP/UDP port number 131 to the COS value 132. In the TCP/UDP port number-to-COS conversion table 130, the table entry 1301 defines the COS value of the WEB service with TCP Port Number "80" and the table entry 1302 defines the COS value of the SIP service with TCP Port Number "5060."

Figures 5, 6:
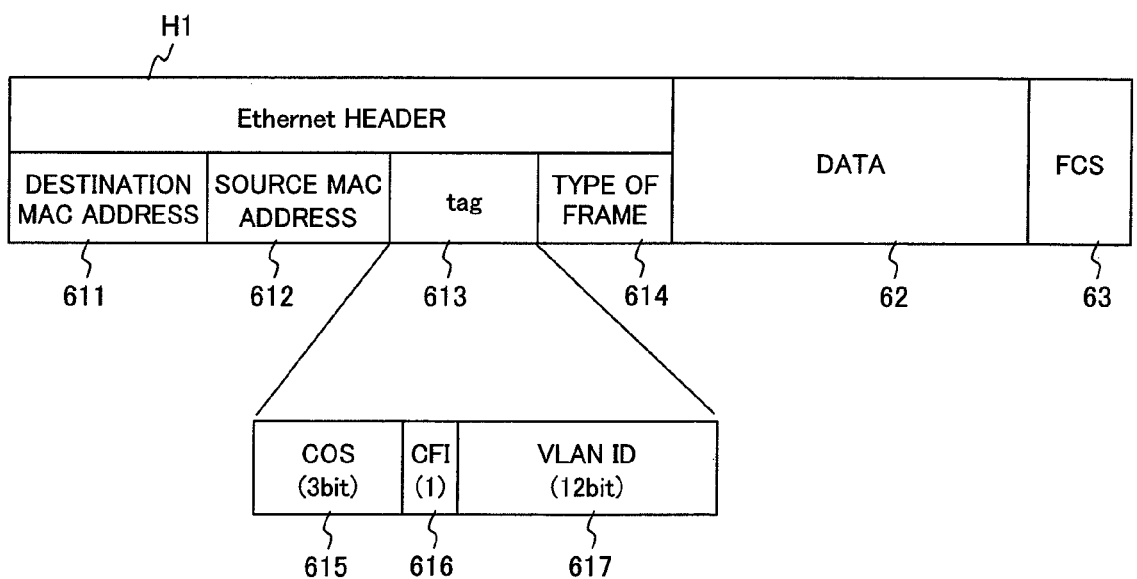
FIG. 5 is a view showing an example of a VLAN ID & COS-to-MST instance conversion table provided in the bridge BR shown in FIG. 3.
FIG. 6 is a format of an Ethernet frame.

FIG. 5 shows an example of the VLAN ID & COS-to-MST instance conversion table 350 provided in the bridge BR.

The VLAN ID & COS-to-MST instance conversion table 350 is composed of a plurality of table entries each indicating the value of the MST instance identifier 353 in association with the combinations of the VLAN ID 351 and the COS value 352. The table entry 3501 defines the MST instance #1 shown in FIG. 1, and the table entries 3502 and 3503 define the MST instances #2 and #3, respectively.

FIG. 6 shows a format of an Ethernet frame to be forwarded between the personal computer PC and the bridge BR and between the individual bridges BR in the transit network.

An Ethernet frame 60 is comprised of an Ethernet header H1, a data portion 62, and an FCS (Frame Check Sequence) 63. The Ethernet header H1 is composed of a destination MAC address 611, a source MAC address 612, a tag field 613, and a type of frame 614. The tag field 613 includes a 3-bit COS field 615, a 1-bit CFI (Canonical Format Indicator) field 616, and a 12-bit VLAN ID field 617.

Next, a description will be given to the transmission and reception of data in the personal computer PC by referring to FIGS. 7 to 9.

Figure 7:
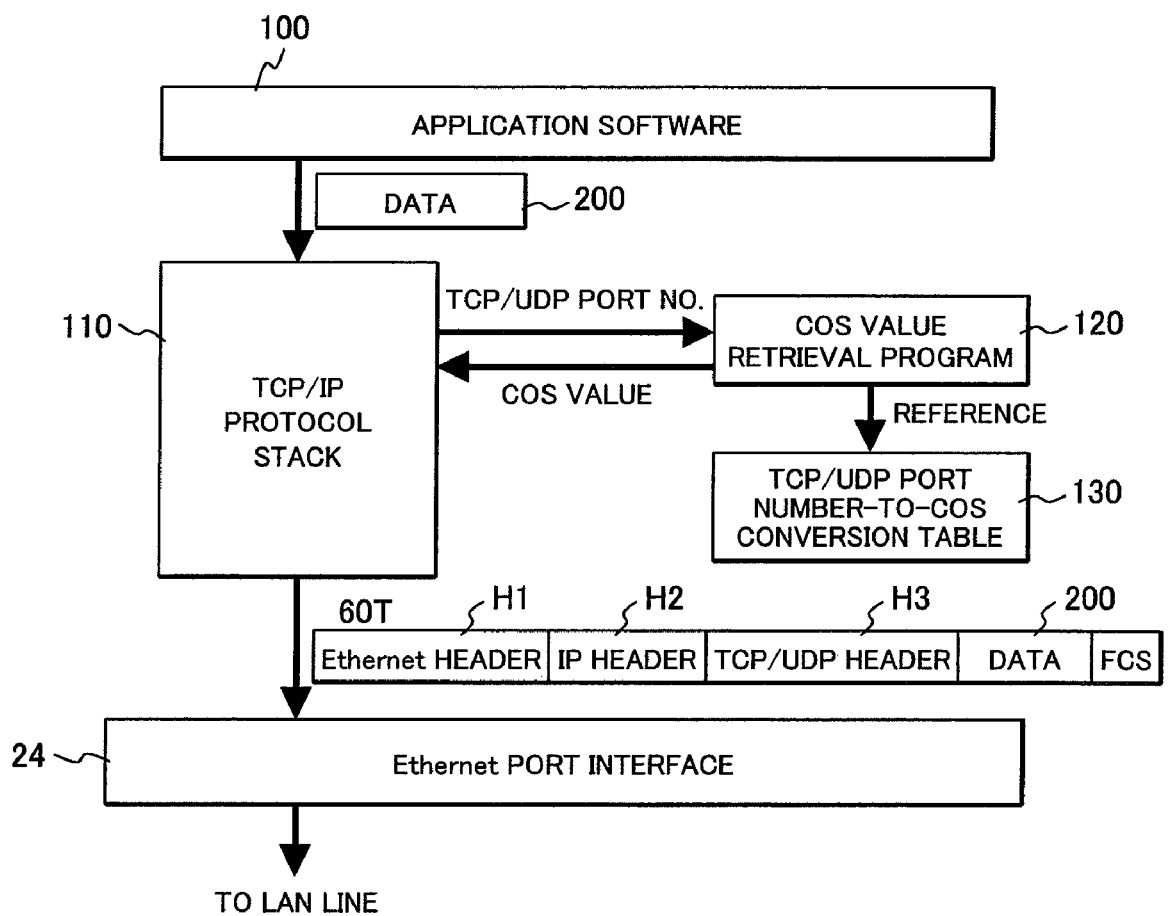
FIG. 7 is a view for illustrating the operation of transmitting a data frame in the personal computer PC.

FIG. 7 shows a part of the PC components shown in FIG. 2 which are particularly related to data transmission.

When transmission data 200 is produced by the application software program 100, the processor 21 generates a TCP/UDP header H3, an IP header H2, and the Ethernet header H1 to be added to the transmission data 200 in accordance with the TCP/IP protocol stack 110, thereby to form an Ethernet frame shown in FIG. 6. At this time, the TCP/IP protocol stack 110 calls the COS value retrieval program 120 by using the TCP/UDP port number as an argument. The COS value retrieval program 120 retrieves the COS value from the TCP/UDP port number-to-COS conversion table 130 by using the TCP/UDP port number specified by the argument as a search key and returns the retrieved COS value to the TCP/IP protocol stack 110.

The TCP/IP protocol stack 110 sets the COS value specified by the COS value retrieval program 120 to the tag field 613 (COS field 615) of the Ethernet header H1. If the transmission Ethernet frame is not a TCP/UDP frame, the TCP/IP protocol stack 110 sets "0" to the COS field 615 without calling the COS value retrieval program 120. The transmission Ethernet frame 60T generated by the TCP/IP protocol stack 110 is transmitted to the LAN line via the Ethernet port interface 24.

Figure 8:
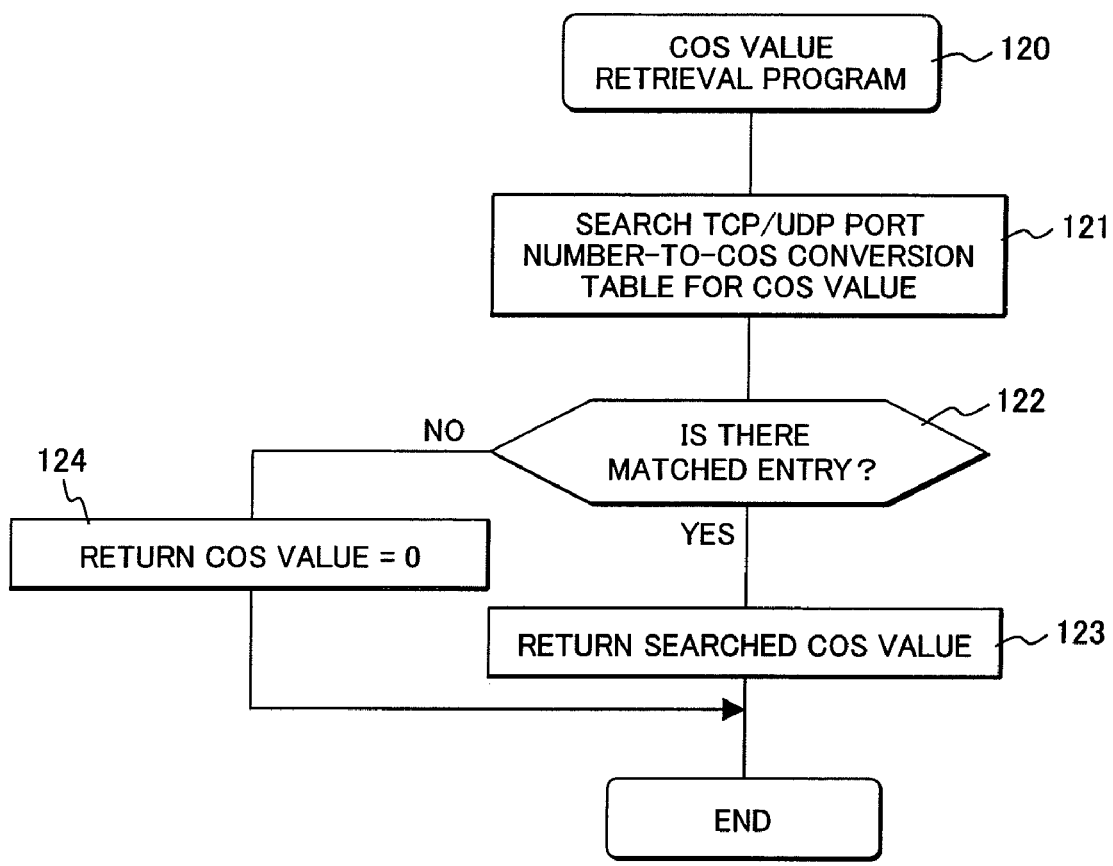
FIG. 8 is a flow chart of a COS value retrieval program 120.

FIG. 8 shows a flow chart of the COS value retrieval program 120.

The COS value retrieval program 120 searches the TCP/UDP port number-to-COS conversion table 130 for a table entry matched with the TCP/UDP port number specified by the argument (Step 121). The result of the search is judged (122) and, when the table entry matched with the search key was found, the COS value indicated in the searched table entry is returned to the TCP/IP protocol stack 110 (123). If the table entry matched with the search key was not found, the COS value "0" is returned to the TCP/IP protocol stack 110 (124).

Figure 9:
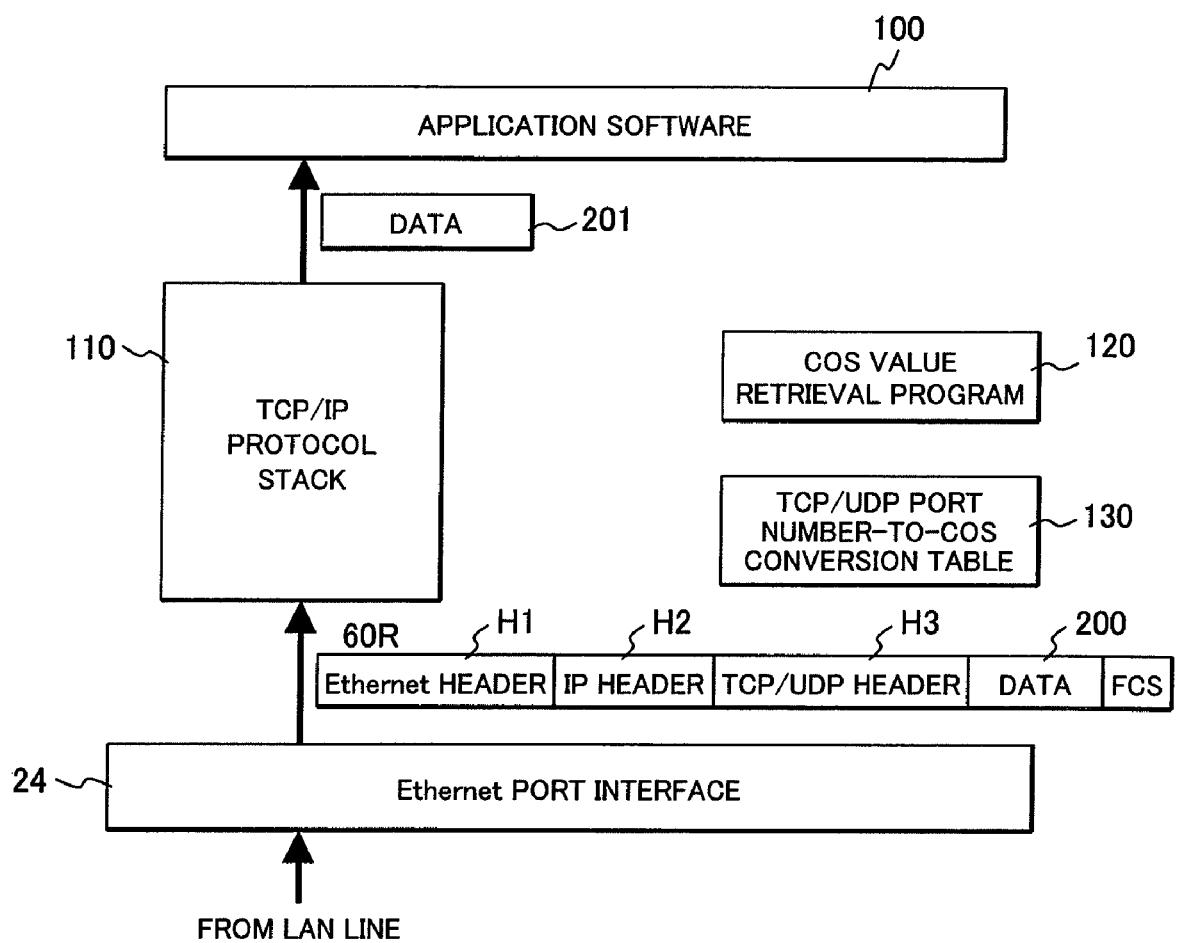
FIG. 9 is a view for illustrating the operation of receiving a data frame in the personal computer PC.

FIG. 9 shows the operation of receiving a data frame in the personal computer PC.

An Ethernet frame 60R received from the LAN line by the Ethernet port interface 24 is processed by the TCP/IP protocol stack 110. The TCP/IP protocol stack 110 eliminates the Ethernet header H1, the IP header H2, and the TCP/UDP header H3 from the received frame 60R and the contents of the data portion 200 is transferred as received data 201 to the application software program 100.

Figure 10:
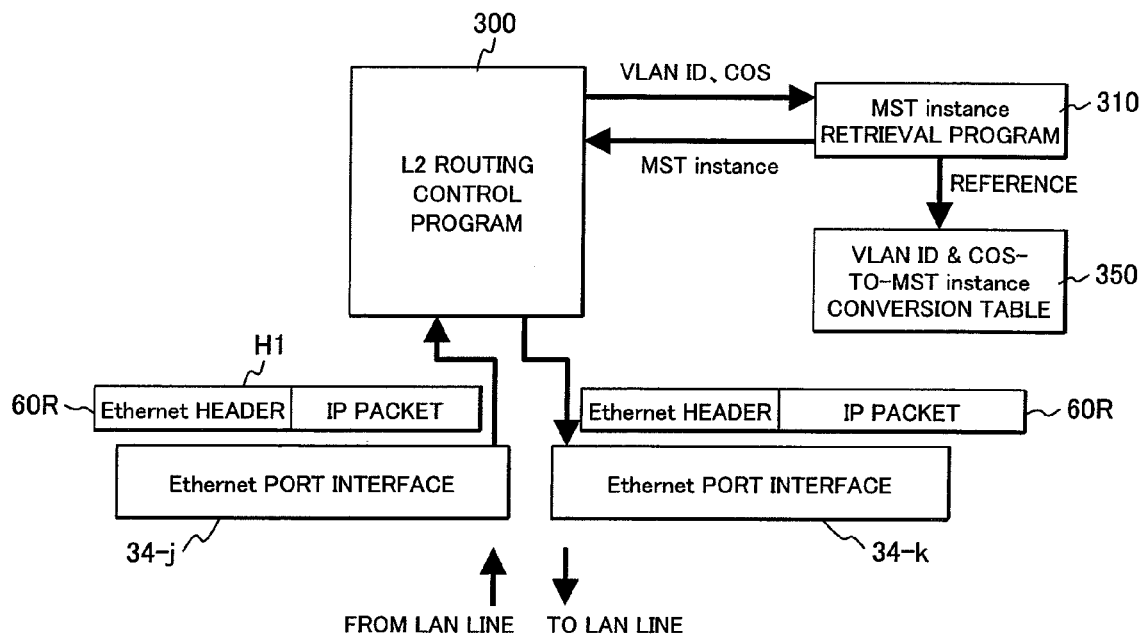
FIG. 10 is a view for illustrating the operation of forwarding the Ethernet frame in the bridge BR.

FIG. 10 shows the operation forwarding the Ethernet frame in the bridge BR.

The processor 31 processes the Ethernet frame 60R received from the LAN line by any one of the Ethernet port interfaces, e.g., 34-I, in accordance with the L2 routing control program 300. The L2 routing control program 300 extracts the VLAN ID 617 and the COS value 615 from the Ethernet header H1 of the received Ethernet frame 60R and calls the MST instance retrieval program 310 by using the values of the VLAN ID 617 and the COS value 615 as arguments.

The MST instance retrieval program 310 searches the VLAN ID & COS-to-MST instance conversion table 350, using the combination of values of the VLAN ID and the COS specified by the L2 routing control program 300 as a search key, for the MST instance identifier 353 corresponding to the search key and returns the MST instance identifier 353 to the L2 routing control program 300.

The L2 routing control program 300 determines an Ethernet port interface 34-k to which the received frame is to be forwarded, in accordance with the STP route corresponding to the MST instance identifier 353 and transmits the Ethernet frame 60R from the interface.

Figure 11:
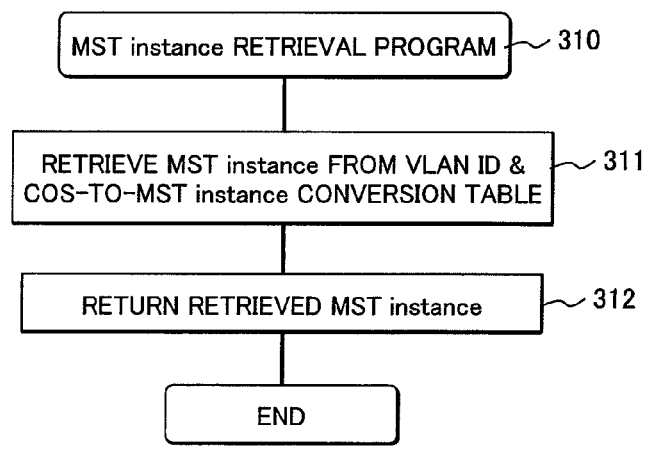
FIG. 11 is a flow chart of an MST instance retrieval program 310.

FIG. 11 shows a flow chart of the MST instance retrieval program 310.

The MST instance retrieval program 310 refers to the VLAN ID & COS-to-MST instance conversion table 350 by using the combination of the VAN ID and the COS value given by the L2 routing control program 300 as a search key to retrieve the MST instance identifier 353 matched with the search key (Step 311). The retrieved MST instance identifier is returned to the L2 routing control program 300 (312).

Embodiment 2

Figure 12:
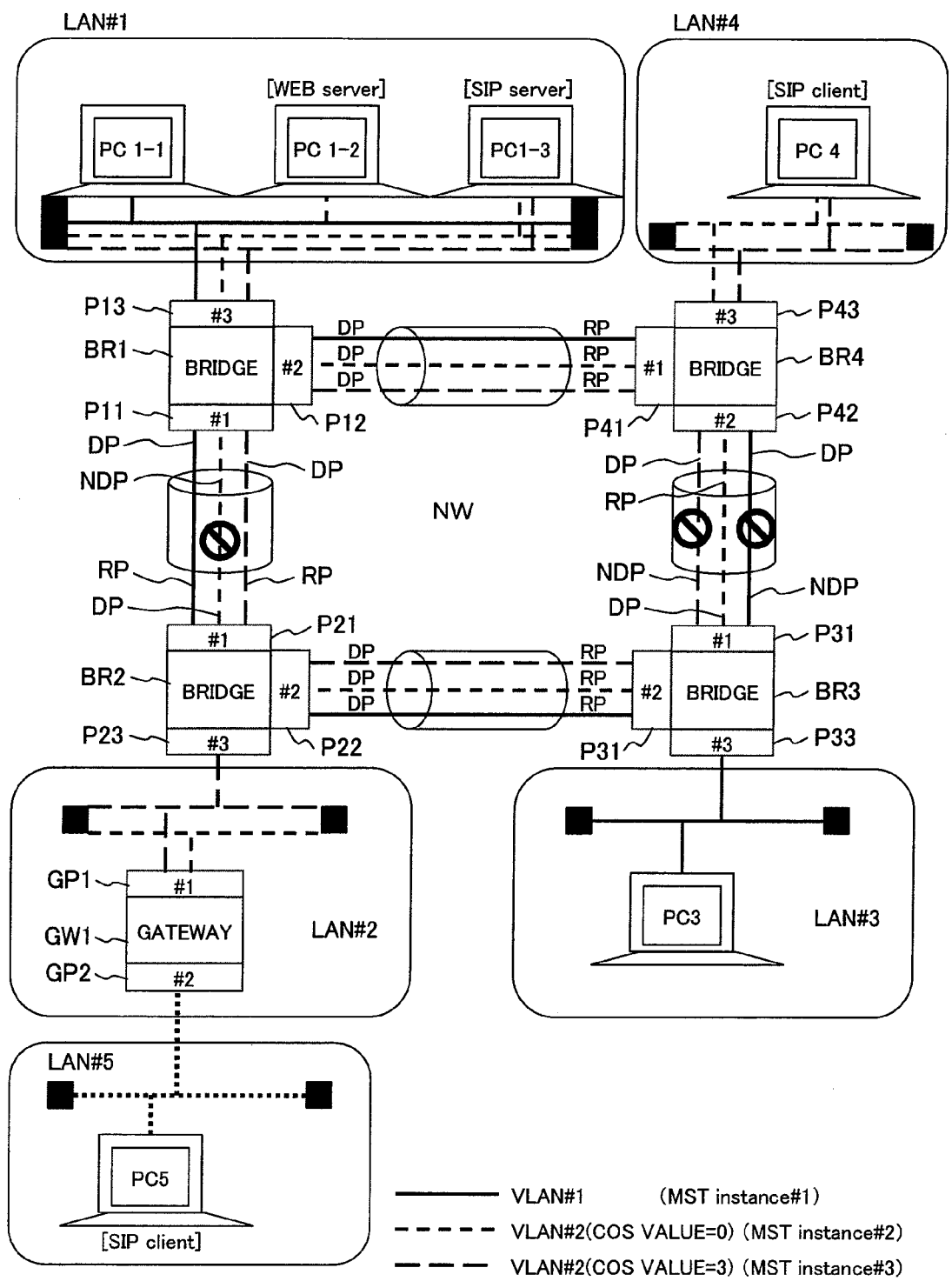
FIG. 12 is a view showing a second embodiment of the bridged VLAN to which the present invention is applied.

FIG. 12 shows an example of a structure of another network structure of the bridged VLAN to which the present invention is applied.

The network shown in FIG. 12 is different from that of FIG. 1 in that another LAN #5 is connected to the transit network NW via a gateway GW1. Although the gateway GW1 is connected to the transit network NW via the LAN #2 in FIG. 12, the gateway GW1 may be connected directly to the Ethernet port P23 of the bridge BR2.

The gateway GW1 is connected to the LAN #2 via an Ethernet port GP1 and connected to the LAN #5 via an Ethernet port GP2 to forward communication frames received from the LAN #5 to the LAN #2 and forward communication frames received from the LAN #2 to the LAN #5.

Upon receiving a communication frame from the LAN #5, the gateway GW1 according to the present embodiment specifies the COS value in accordance with the TCP/UDP port number indicated by the received frame, sets the specified COS value to the tag field of the Ethernet header H1, and forwards the received frame to the LAN #2. To the LAN #5, a personal computer PC5 is connected. The personal computer PC5 is a SIP client and communicates with another SIP client, e.g., the personal computer PC4 via the SIP server (PC1-3).

In the present embodiment, since the gateway GW1 sets the COS value to the communication frame received from the LAN #5, it is unnecessary to provide the personal computer PC5 with the function of setting the COS value described in the first embodiment. That is, the COS value retrieval program 120 and the TCP/UDP port number-to-COS conversion table 130 shown in FIG. 2 are not necessary for the personal computer PC5.

Figures 13, 14:
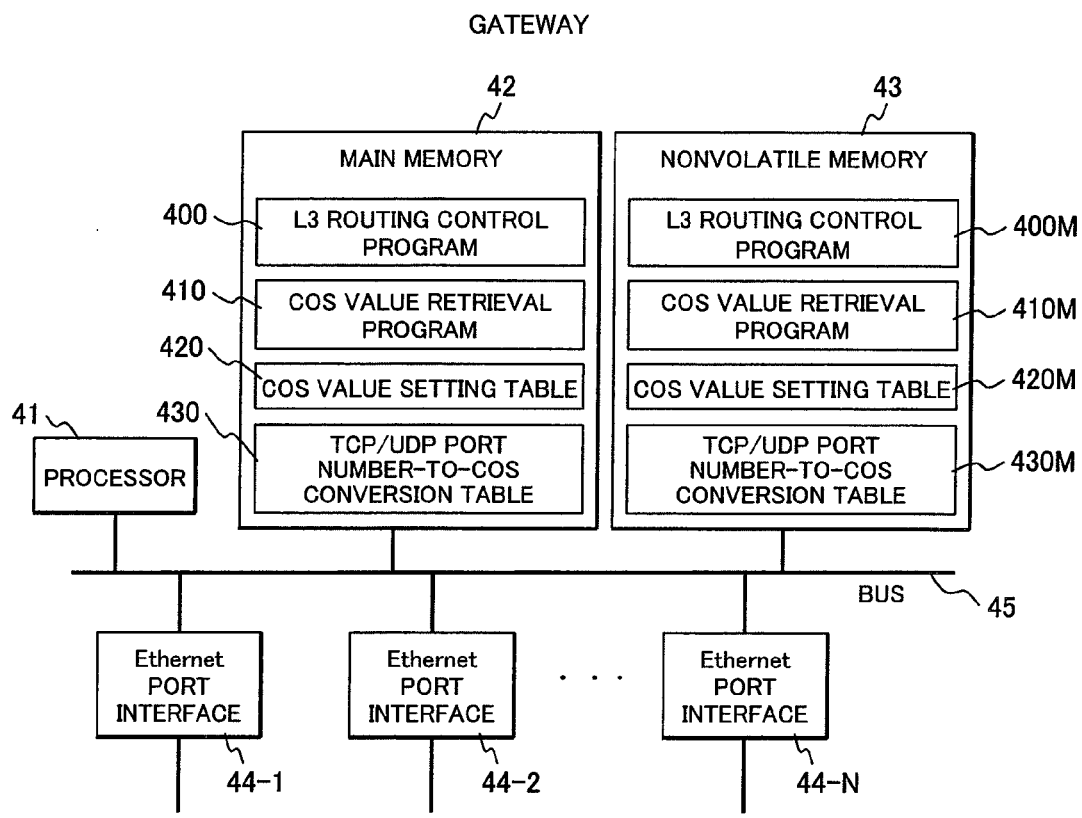
FIG. 13 is a structural view showing an embodiment of the gateway GW shown in FIG. 12.
FIG. 14 is a view showing an example of a COS value setting table 420 provided in the gateway GW.

FIG. 13 shows an example of the gateway GW1.

The gateway GW1 comprises a processor (CPU) 41, a main memory 42, a nonvolatile memory 43, a plurality of Ethernet port interfaces 44-1 to 44-N, and an internal bus 45 connecting these components to each other. In the nonvolatile memory 43, a L3 routing control program 400M having a routing table (not shown), a COS value retrieval program 410M, a COS value setting table 420M, and a TCP/UDP port number-to-COS conversion table 430M are prepared as software related to the present invention. On the activation of the gateway, these software programs and tables are loaded in the main memory 42 (400 to 430) and executed or referred to by the processor 41.

Upon receiving an Ethernet frame from the LAN #5, the L3 routing control program 400 extracts the TCP/UDP port number from the received frame, specifies the COS value corresponding to the TCP/UDP port number by using the COS value retrieval program 410, and sets the specified COS value to the tag of the Ethernet header H1. The L3 routing control program 400 specifies the output port number of the Ethernet frame in accordance with the routing table and sends out the received Ethernet frame from a proper Ethernet port interface corresponding to the output port number.

The COS value retrieval program 410 refers to the COS setting table 420 and the TCP/UDP port number-to-COS conversion table 430 to retrieve the COS value corresponding to the TCP/UDP port number specified by the L3 routing control program 400, and returns the retrieved COS value to the L3 routing control program 400.

FIG. 14 shows an example of the COS value setting table 420.

The COS setting table 420 includes a flag 422 for indicating whether the COS value should be set or not for each of the identification numbers 421 of the Ethernet ports provided in the gateway GW1. In the example shown here, the flag 422 is set to "1" in the table entry for the Ethernet port number #1. This indicates that the COS value should be set to a communication frame to be forwarded to the Ethernet port GP1.

Figures 15, 16:
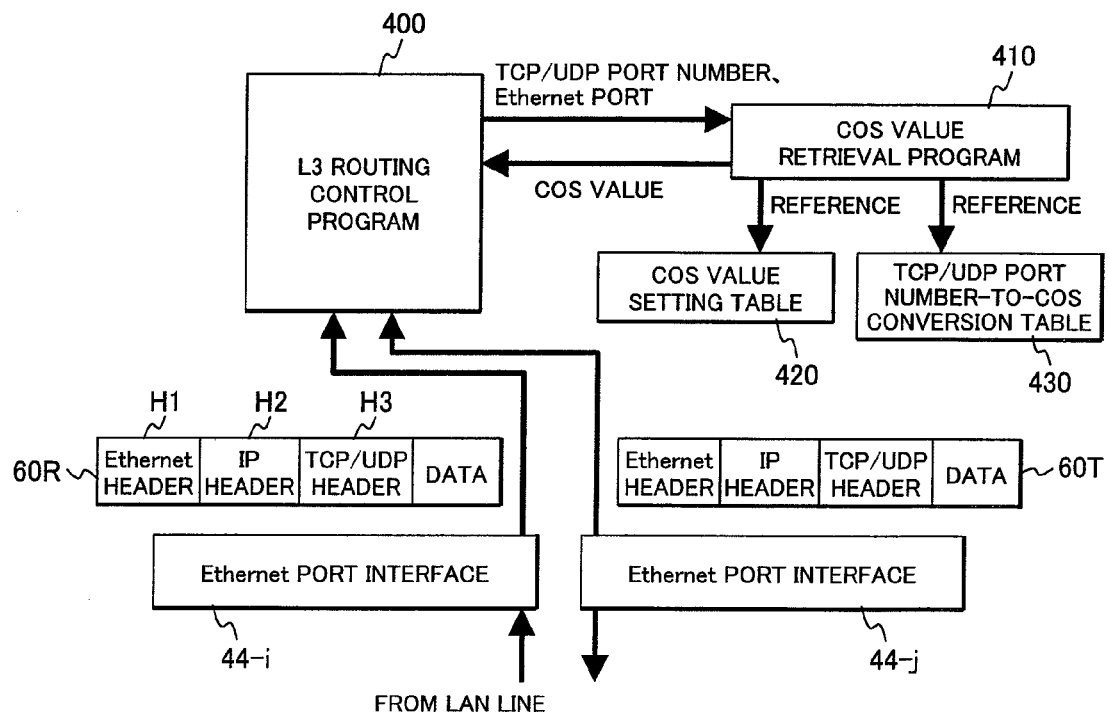
FIG. 15 is a view showing an example of a TCP/UDP port number-to-COS conversion table provided in the gateway GW.
FIG. 16 is a view for illustrating the operation of forwarding a data frame in the gateway GW.

FIG. 15 shows an example of the TCP/UDP port number-to-COS conversion table 430 provided in the gateway GW1.

The TCP/UDP port number-to-COS conversion table 430 indicates the correspondence of the TCP/UDP port numbers 431 to the COS values 432, similarly to the TCP/UDP port number-to-COS conversion table 130 provided in the personal computer PC according to the first embodiment.

FIG. 16 shows the operation of forwarding a data frame in the gate way GW1.

When one of the Ethernet port interfaces, e.g., the i-th interface 44-i receives an Ethernet frame 60R, the processor 41 processes the received frame in accordance with the L3 routing control program 400. The L3 routing control program 400 checks the header of the received frame and extracts the TCP/UDP port number when the received frame has the TCP/UDP header H2. In addition, the L3 routing control program 400 refers to the routing table to specify the Ethernet port number to be the destination of the received data.

The processor 41 calls the COS value retrieval program 410 by using the TCP/UDP port number and the Ethernet port number as arguments. If the TCP/UDP port number is not extracted, the processor 41 sends out the received frame from the Ethernet port interface specified by the Ethernet port number, e.g., the interface 44-j without calling the COS value retrieval program 410.

The COS value retrieval program 410 refers to the COS value setting table 420 to determine the COS value setting flag 422 corresponding to the specified Ethernet port number. When the COS value setting flag 422 is "1", the COS value retrieval program 410 refers to the TCP/UDP port number-to-COS conversion table (13010) to retrieve the COS value corresponding to the specified TCP/UDP port number, and returns the retrieved COS value to the L3 routing control program 400.

The L3 routing control program 400 sets the COS value notified from the COS value retrieval program 410 to the Ethernet header H1 (COS field 615) of the received frame and sends out the received frame from the Ethernet port interface specified by the destination Ethernet port number, e.g., the interface 44-j.

Figure 17:
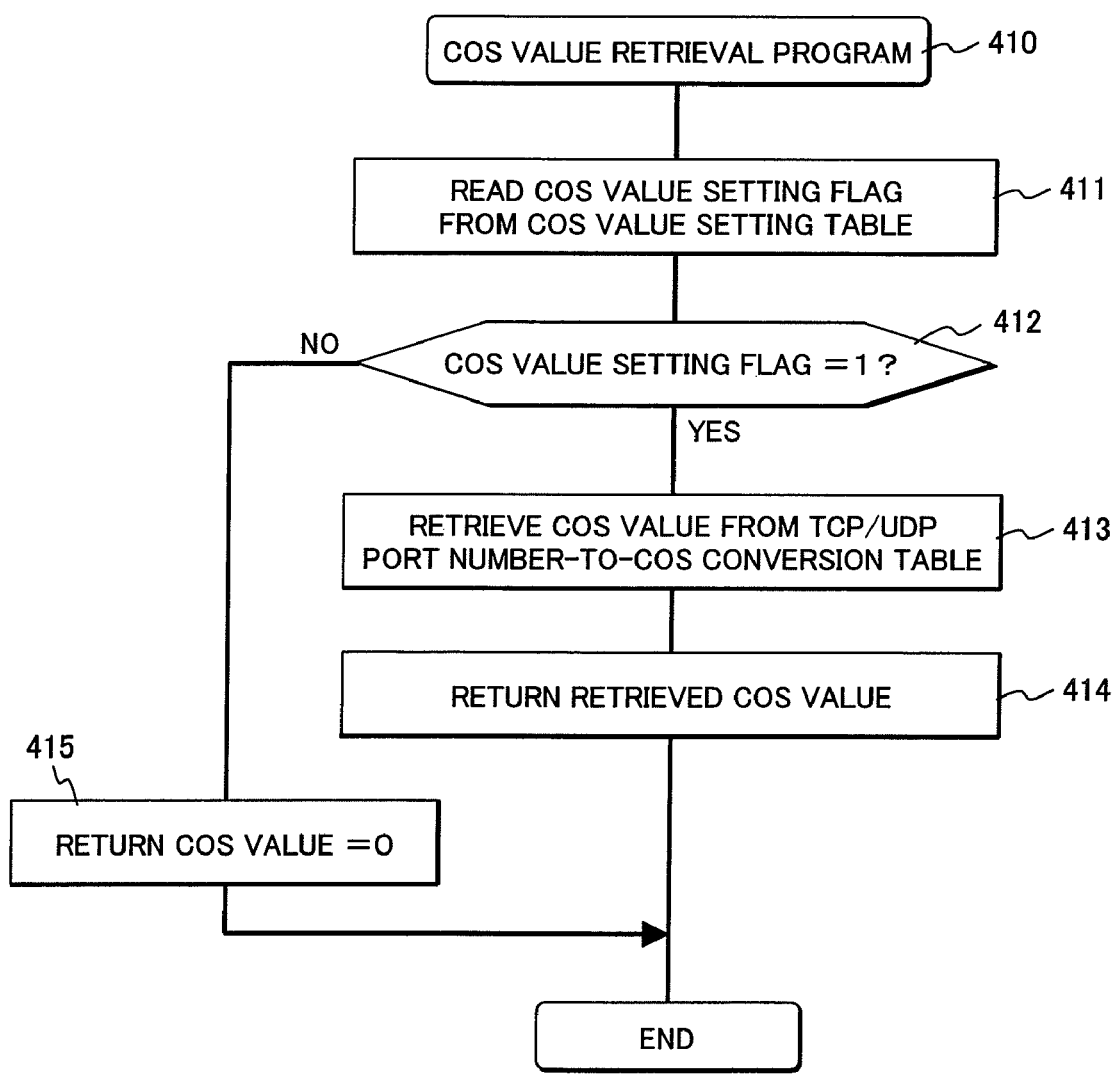
FIG. 17 is a flow chart of a COS value retrieval program 410 to be executed in the gateway GW.
Figure 18:
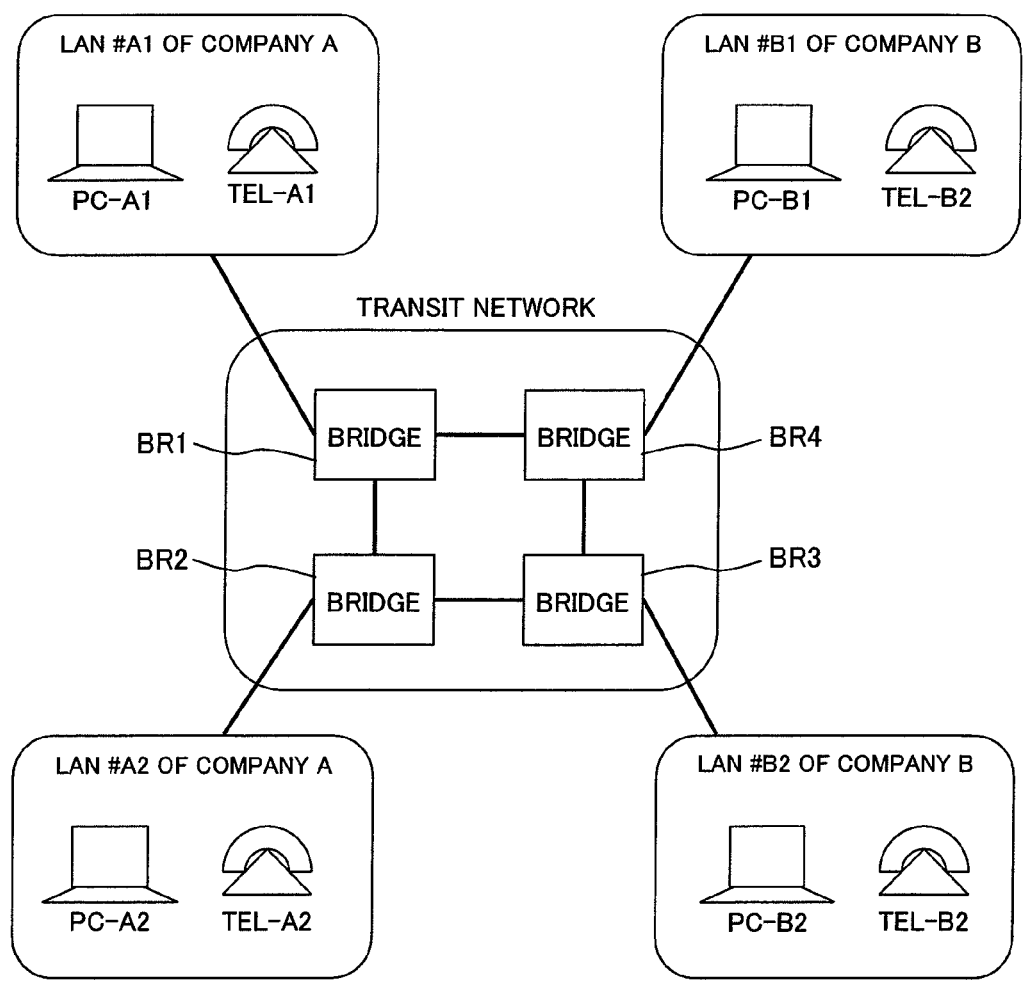
FIG. 18 is a view showing a network structure of a conventional bridged LAN using a public network.
Figure 19:
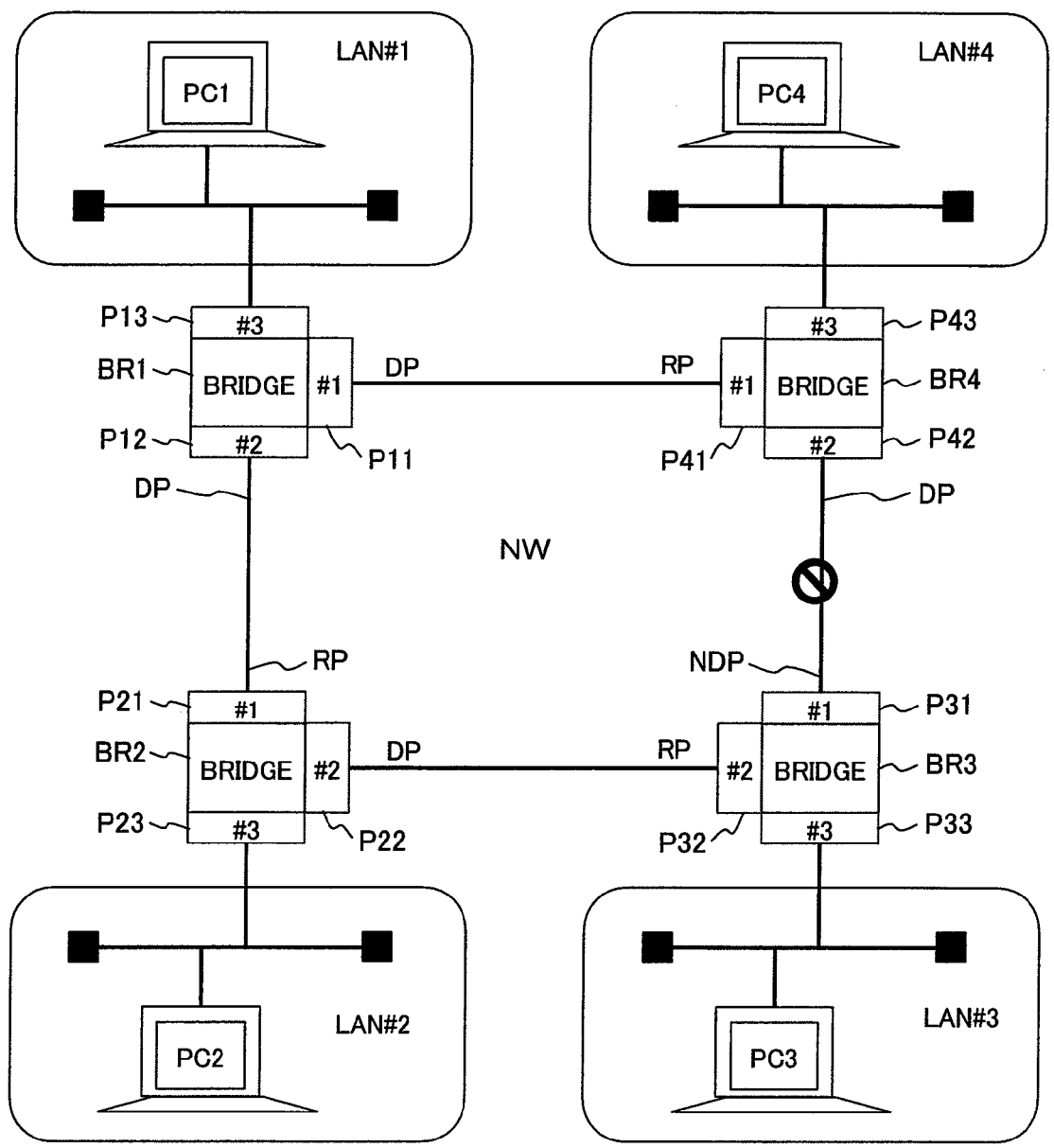
FIG. 19 is a view showing an example of a conventional network structure to which the STP is applied.

FIG. 17 shows a flow chart of the COS value retrieval program 410.

In the COS value retrieval program 410, the processor 41 reads out the COS value setting flag 422 corresponding to the specified output Ethernet port from the COS value setting table 420 (Step 411). The processor 41 judges the COS value setting flag (412). When the flag is "0", the processor 41 returns the COS value "0" to the L3 routing control program 400 (415) and terminates the program. When the COS setting flag is "1", the processor 41 searches the TCP/UDP port number-to-COS conversion table 430 for a table entry corresponding to the specified TCP/UDP port number (413), returns the COS value 432 indicated in the searched table entry to the L3 routing control program 400 (414), and terminates the program.

According to the second embodiment, the COS value setting function for specifying an MST instance needs not be provided in a terminal apparatus connected to the transit network NW via the gateway GW1, such as the personal computer PC5. As a result, it becomes possible to easily provide a communication service via an optimum route to a plurality of terminal apparatuses connected to the LAN #5.

What is claimed is:

1. A bridged LAN comprising:
   a transit network in which a plurality of Virtual LANs (VLANs) are formed; and
   a plurality of local area networks (LANs) connected to the transit network in which a logical spanning tree is formed for each of Multiple Spanning Tree Protocol (MST) instances composed of one or more of VLANs,
   the transit network being composed of a plurality of bridges for transmitting and receiving Ethernet frames,
   each of said bridges having:

a conversion table defining an identifier of each of the MST instances in association with a combination of a VLAN identifier and a value of a Class of Service (COS); and means for forming in said transit network the spanning tree for each of the MST instance identifiers defined in the conversion table;

a specified one of said plurality of VLANs comprising:

a session management server belonging to a first LAN; and a plurality of second LANs each including at least one client terminal;

wherein each of said bridges extracts a VLAN identifier and a COS value from a header of a received frame, specifies the MST instance identifier of the received frame in accordance with said conversion table, and forwards the received frame in accordance with a route of the spanning tree having the MST instance identifier, and wherein a spanning tree having the MST instance identifier associated with the combination of the identifier of the specified VLAN and the COS value allocated for voice communication is formed so as to minimize a frame forwarding delay between said first LAN and each of said second LANs.

2. The bridged LAN according to claim 1, wherein said means for forming the spanning tree forms a first spanning tree and a second spanning tree having different routes in said transit network, in association with a first instance identifier and a second MST instance identifier having the same VLAN identifier and different COS values.

3. The bridged LAN according to claim 1, wherein each of terminal apparatuses connected to each of said LANs transmits the Ethernet frame including the VLAN identifier and the COS value in a header portion thereof.

4. A bridged LAN comprising:

a transit network in which a plurality of Virtual LANs VLANs) are formed;

a plurality of local area networks (LANs) connected to the transit network in which a logical spanning tree is formed for each of Multiple Spanning Tree Protocol (MST) instances composed of one or more of VLANs, and a gateway apparatus for setting a COS value determined by a TCP/UDP port number of a frame received from one of said LANs to a header portion of the received frame and forwarding the received frame to said transit network, the transit network being composed of a plurality of bridged for transmitting and receiving Ethernet frames, each of said bridges having:

a conversion table defining an identifier of each of the MST instances in association with a combination of a VLAN identifier and a value of a Class of Service (COS); and means for forming in said transit network the spanning tree for each of the MST instance identifiers defined in the conversion table; and wherein each of said bridges extracts a VLAN identifier and a COS value from a header of a received frame, specifies the MST instance identifier of the received frame in accordance with said conversion table, and forwards the received frame in accordance with a route of the spanning tree having the MST instance identifier.

5. A gateway apparatus to be connected between a bridged LAN and at least one of a plurality of LANs, the bridged LAN comprising a transit network in which a plurality of Virtual LANs (VLANs) are formed, and the plurality of LANs connected to the transit network in which a logical spanning tree is formed for each of Multiple Spanning Tree Protocol (MST) instances composed of one or more of VLANs, the gateway apparatus comprising:

a plurality of port interfaces each having a port numbers;

a conversion table for indicating the correspondence of a TCP/UDP port number to a value of a Class of Service (COS);

a COS value setting table storing flag information for indicating whether a COS value should be set to a received or not in association with the port number; and routing control means for searching, on receiving an Ethernet frame from one of said port interfaces, the COS value setting table for flag information corresponding to the port number of one of said port interfaces to be the destination of the received frame, searching the conversion table for the COS value corresponding to the TCP/UDP port number of the received frame when the flag information indicates that the COS value should be set, setting the COS value to a header portion of the received frame, and forwarding the received frame to the port interface specified by the destination port number.

6. The bridging LAN according to claim 4, wherein said means for forming the spanning tree forms a first spanning tree and a second spanning tree having different routes in said transit network, in association with a first instance identifier and a second MST instance identifier having the same VLAN identifier and different COS values.

7. The bridged LAN according to claim 4, wherein each of terminal apparatuses connected to each of said LANs transmits the Ethernet frame including the VLAN identifier and the COS value in a header portion thereof.

* * * * *